(12) United States Patent
Kelly et al.

(10) Patent No.: US 10,778,900 B2
(45) Date of Patent: Sep. 15, 2020

(54) METHOD AND SYSTEM FOR DYNAMICALLY ADJUSTING CAMERA SHOTS

(71) Applicant: Eikon Technologies LLC, Sonoma, CA (US)

(72) Inventors: Bryan Patrick Kelly, Sonoma, CA (US); Kelly Lea O'Leary, Sonoma, CA (US)

(73) Assignee: Eikon Technologies LLC, Sonoma, CA (US)

(*) Notice: Subject to any disclaimer, the term of this patent is extended or adjusted under 35 U.S.C. 154(b) by 0 days.

(21) Appl. No.: 15/970,564

(22) Filed: May 3, 2018

(65) Prior Publication Data

US 2019/0281223 A1    Sep. 12, 2019

Related U.S. Application Data

(60) Provisional application No. 62/639,230, filed on Mar. 6, 2018.

(51) Int. Cl.
*H04N 5/232* (2006.01)
*H04N 5/225* (2006.01)
(Continued)

(52) U.S. Cl.
CPC ..... *H04N 5/23296* (2013.01); *G06F 3/04845* (2013.01); *G06K 9/00315* (2013.01);
(Continued)

(58) Field of Classification Search
CPC ............. H04N 5/23296; H04N 5/2259; H04N 5/23216; G06F 3/04845; G06K 9/00315; G10L 25/87; G10L 25/48
See application file for complete search history.

(56) References Cited

U.S. PATENT DOCUMENTS 3,837,736 A    9/1974 Osigo et al.
4,862,278 A    8/1989 Dann et al.
(Continued)

OTHER PUBLICATIONS

Notification of Transmittal of The International Search Report and The Written Opinion of the International Searching Authority, or The Declaration; International Search Report and Written Opinion for corresponding International Patent Application No. PCT/US18/53768, dated Dec. 14, 2018, 18 pages.

*Primary Examiner* — Antoinette T Spinks
(74) *Attorney, Agent, or Firm* — Ditthavong & Steiner, P.C.

(57) ABSTRACT

An approach is provided for adjusting camera shots. The approach involves receiving an audio signal via a microphone of a mobile device during video recording of a subject by a camera of the mobile device. The approach also involves determining, at the mobile device, an audio level in a vicinity of the subject based on the received audio signal, wherein the audio level is based on sounds produced by the subject. The approach additionally involves determining that the audio level triggers a shot adjustment state. In the alternative or in addition to, the shot adjustment state is triggered by facial expression of the subject. The approach further involves dynamically adjusting, in response to the shot adjustment state, one or more camera parameters of the camera to alter shot of the subject by the camera during the video recording. The camera parameters relate to either zoom control, aperture, lighting, or a combination thereof.

17 Claims, 11 Drawing Sheets

(51) Int. Cl.
*G10L 25/87* (2013.01)
*G06K 9/00* (2006.01)
*G06F 3/0484* (2013.01)
*G10L 25/48* (2013.01)

(52) U.S. Cl.
CPC ......... *G10L 25/87* (2013.01); *H04N 5/2259* (2013.01); *H04N 5/23216* (2013.01); *G10L 25/48* (2013.01)

(56) References Cited

U.S. PATENT DOCUMENTS

| | | | |
|---|---|---|---|
| 4,984,087 A | 1/1991 | Fujimura et al. | |
| 5,477,270 A | 12/1995 | Park | |
| 5,479,203 A | 12/1995 | Kawai et al. | |
| 5,548,335 A | 8/1996 | Mitsuhashi et al. | |
| 7,015,954 B1 | 3/2006 | Foote et al. | |
| 7,430,004 B2 | 9/2008 | Cazier | |
| 8,045,840 B2 | 10/2011 | Murata et al. | |
| 8,054,336 B2 | 11/2011 | Vanderwilt et al. | |
| 8,184,180 B2 | 5/2012 | Beaucoup | |
| 8,300,845 B2 | 10/2012 | Zurek et al. | |
| 8,314,829 B2 | 11/2012 | Cutler | |
| 8,319,858 B2 | 11/2012 | Zhang et al. | |
| 8,750,532 B2 | 6/2014 | Jin | |
| 8,897,454 B2 | 11/2014 | Jeong et al. | |
| 8,982,272 B1 | 3/2015 | Preston | |
| 9,060,133 B2 | 6/2015 | Seo | |
| 9,210,503 B2 | 12/2015 | Avendano et al. | |
| 9,247,192 B2 | 1/2016 | Lee et al. | |
| 9,258,644 B2 | 2/2016 | Maenpaa et al. | |
| 9,596,437 B2 | 3/2017 | Zad et al. | |
| 9,686,605 B2 | 6/2017 | Sun | |
| 9,716,943 B2 | 7/2017 | Laaksonen et al. | |
| 2001/0024233 A1 | 9/2001 | Urisaka et al. | |
| 2002/0080241 A1 | 6/2002 | Paritsky et al. | |
| 2003/0151678 A1 | 8/2003 | Lee et al. | |
| 2005/0140810 A1 | 6/2005 | Ozawa | |
| 2008/0247567 A1 | 10/2008 | Kjolerbakken et al. | |
| 2008/0298796 A1 | 12/2008 | Kuberka et al. | |
| 2009/0109297 A1* | 4/2009 | Nakagawa | G11B 27/10 348/222.1 |
| 2010/0067717 A1* | 3/2010 | Park | H03G 9/005 381/102 |
| 2012/0082322 A1 | 4/2012 | Van Waterschoot et al. | |
| 2012/0169873 A1 | 7/2012 | Hsieh | |
| 2014/0009639 A1 | 1/2014 | Lee | |
| 2015/0146026 A1 | 5/2015 | Walker et al. | |
| 2016/0134803 A1 | 5/2016 | Deng | |
| 2016/0156838 A1 | 6/2016 | Cheng et al. | |
| 2017/0265012 A1 | 9/2017 | Tico et al. | |
| 2017/0280098 A1* | 9/2017 | Sethuraman | H04N 7/15 |

* cited by examiner

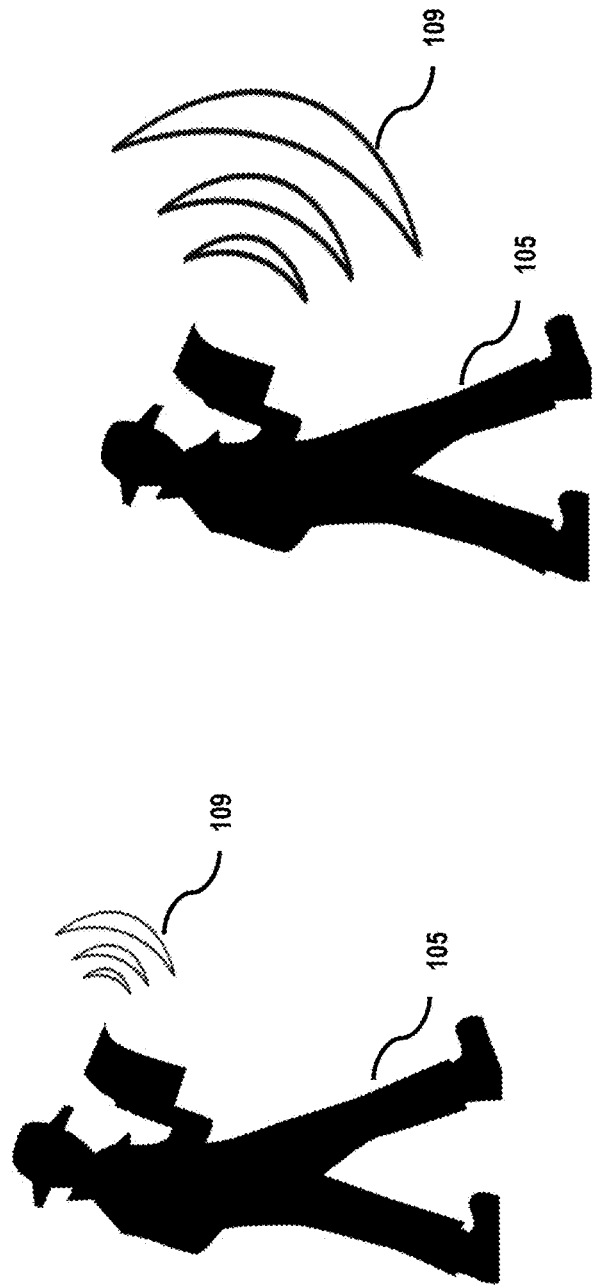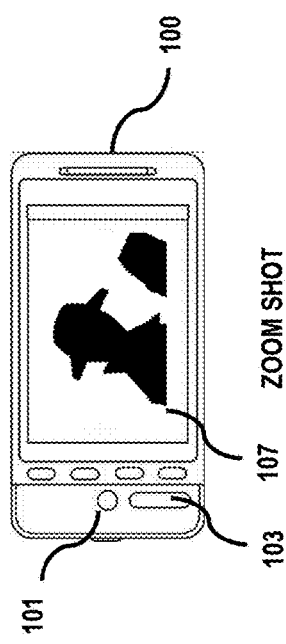

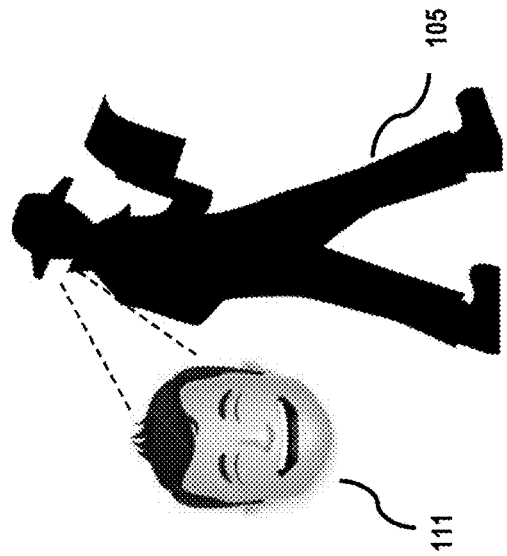
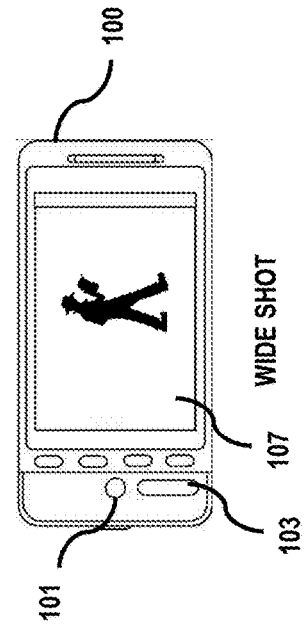
FIG. 1C
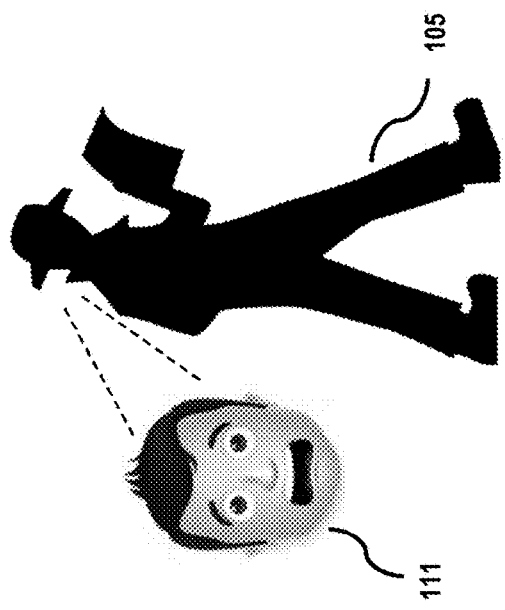
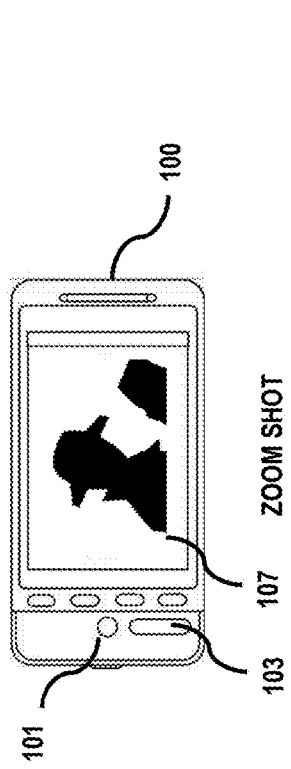
FIG. 1D

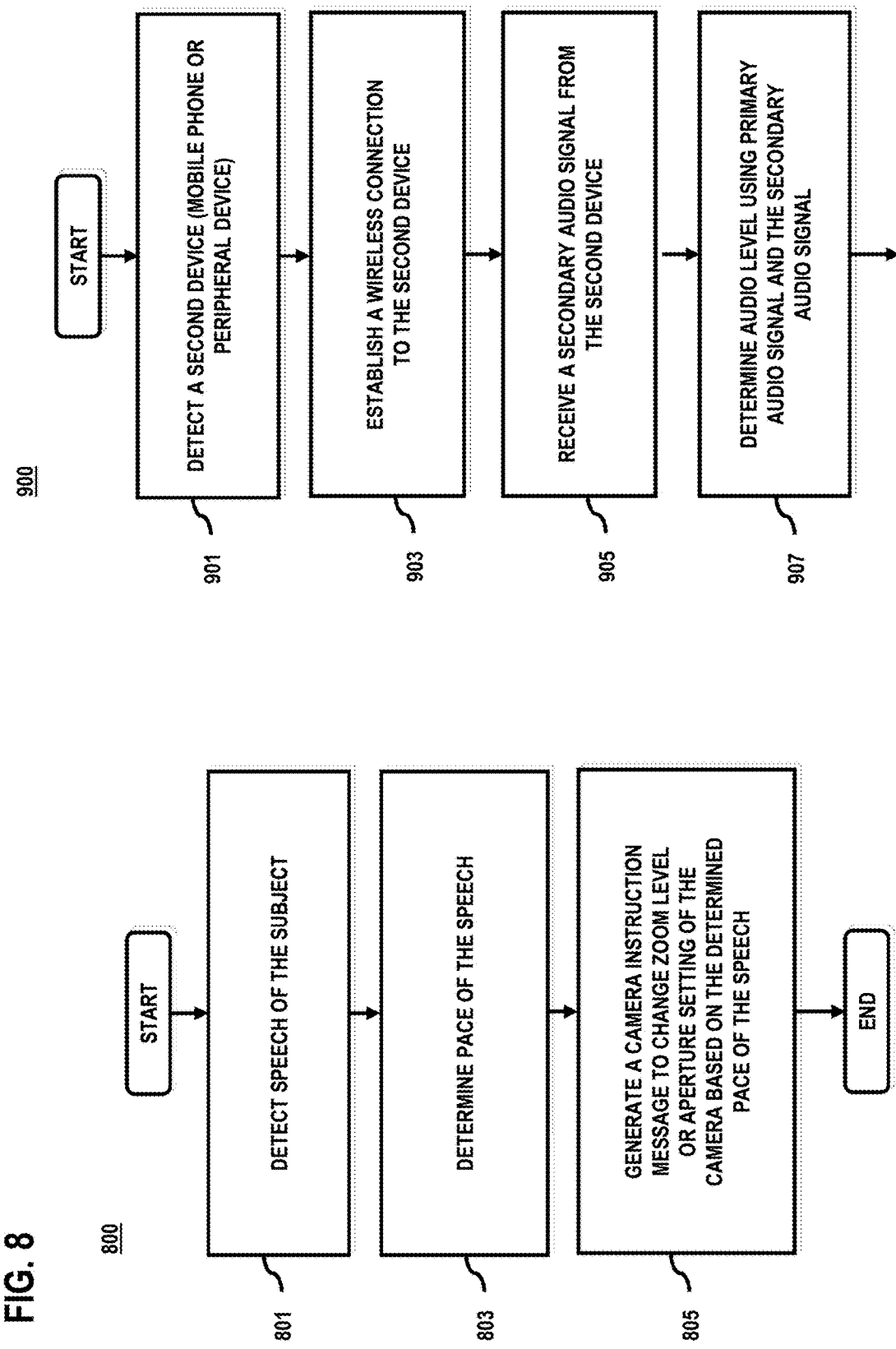

METHOD AND SYSTEM FOR DYNAMICALLY ADJUSTING CAMERA SHOTS

CROSS-REFERENCE TO RELATED APPLICATION

This application claims priority to U.S. patent application Ser. No. 62/639,230, filed on Mar. 6, 2018, entitled "A Software Program that Adjusts the Aperture and Zoom of a Camera in Response to Sound Variation," the entirety of which is incorporated herein by reference.

FIELD OF THE INVENTION

The present invention relates to adjusting camera shots based on audio level or user facial expression.

BACKGROUND OF THE INVENTION

The prevalence and convenience of cameras, particularly by way of smartphones, have seen a remarkable growth in "amateur" production of video content. Moreover, the "selfie" generation, coupled with social media outlets, has caused more and more content to be generated. The notion of a "selfie" is that the camera operator self-operates the camera without assistance from anyone else, such that the camera operator is also the subject of the photo or video recording. At times, these self-productions can be monetized. With instructional and reality-based content, everyone is a potential producer. As such, monetization demands greater quality in the video production. However, most camera operators/producers traditionally do not have training in filmmaking to improve their production quality, without additional resources and expense.

Therefore, there is a need for a mechanism to assist with camera shot making that supports single user operation.

SUMMARY OF THE INVENTION

According to one embodiment, a method comprises receiving an audio signal via a microphone of a mobile device during video recording of a subject by a camera of the mobile device. The method also comprises determining, at the mobile device, an audio level in a vicinity of the subject based on the received audio signal, wherein the audio level is based on sounds produced by the subject. The method further comprises determining that the audio level triggers a shot adjustment state. The method also comprises dynamically adjusting, in response to the shot adjustment state, one or more camera parameters of the camera to alter shot of the subject by the camera during the video recording. The camera parameters relate to either zoom control, aperture, lighting, or a combination thereof. Alternatively, the method comprises detecting facial expression of the subject; and determining that the facial expression triggers the shot adjustment state, wherein the dynamic adjustment is further based on the detected facial expression.

According to another embodiment, an apparatus comprises at least one processor, and at least one memory including computer program code for one or more computer programs, the at least one memory and the computer program code configured to, with the at least one processor, cause, at least in part, the apparatus to receive an audio signal via a microphone of a mobile device during video recording of a subject by a camera of the mobile device. The apparatus is also caused to determine, at the mobile device, an audio level in a vicinity of the subject based on the received audio signal, wherein the audio level is based on sounds produced by the subject. The apparatus is further caused to determine that the audio level triggers a shot adjustment state. The apparatus is further caused to dynamically adjust, in response to the shot adjustment state, one or more camera parameters of the camera to alter shot of the subject by the camera during the video recording. The camera parameters relate to either zoom control, aperture, lighting, or a combination thereof. Alternatively, the apparatus is further caused to detect facial expression of the subject; and to determine that the facial expression triggers the shot adjustment state, wherein the dynamic adjustment is further based on the detected facial expression.

According to another embodiment, a system comprises a mobile device configured to receive an audio signal via a microphone of a mobile device during video recording of a subject by a camera of the mobile device; and an audio processing module configured to determine an audio level in a vicinity of the subject based on the received audio signal, wherein the audio level is based on sounds produced by the subject. The system also comprises a facial recognition module configured to detect facial expression of the subject; and a shot adjustment module configured to determine that the audio level or the facial expression triggers a shot adjustment state, and to instruct a camera controller within the mobile device to dynamically adjust, in response to the shot adjustment state, one or more camera parameters of the camera to alter shot of the subject by the camera during the video recording. The camera parameters relate to either zoom control, aperture, lighting, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 1A and 1B are, respectively, diagrams of a mobile device configured to provide zoom level or aperture control based on audio level within vicinity of the subject, according to various embodiments;

FIGS. 1C and 1D are, respectively, diagrams of a mobile device configured to provide zoom level or aperture control based on facial expressions of the subject, according to various embodiments;

FIG. 8 is a flowchart of a process for generating camera instructions based on pacing of speech, according to an exemplary embodiment;

FIG. 9 is a flowchart of a process for determining audio level from multiple audio signal sources, according to an exemplary embodiment;

DESCRIPTION OF THE PREFERRED EMBODIMENT

Figure 2:
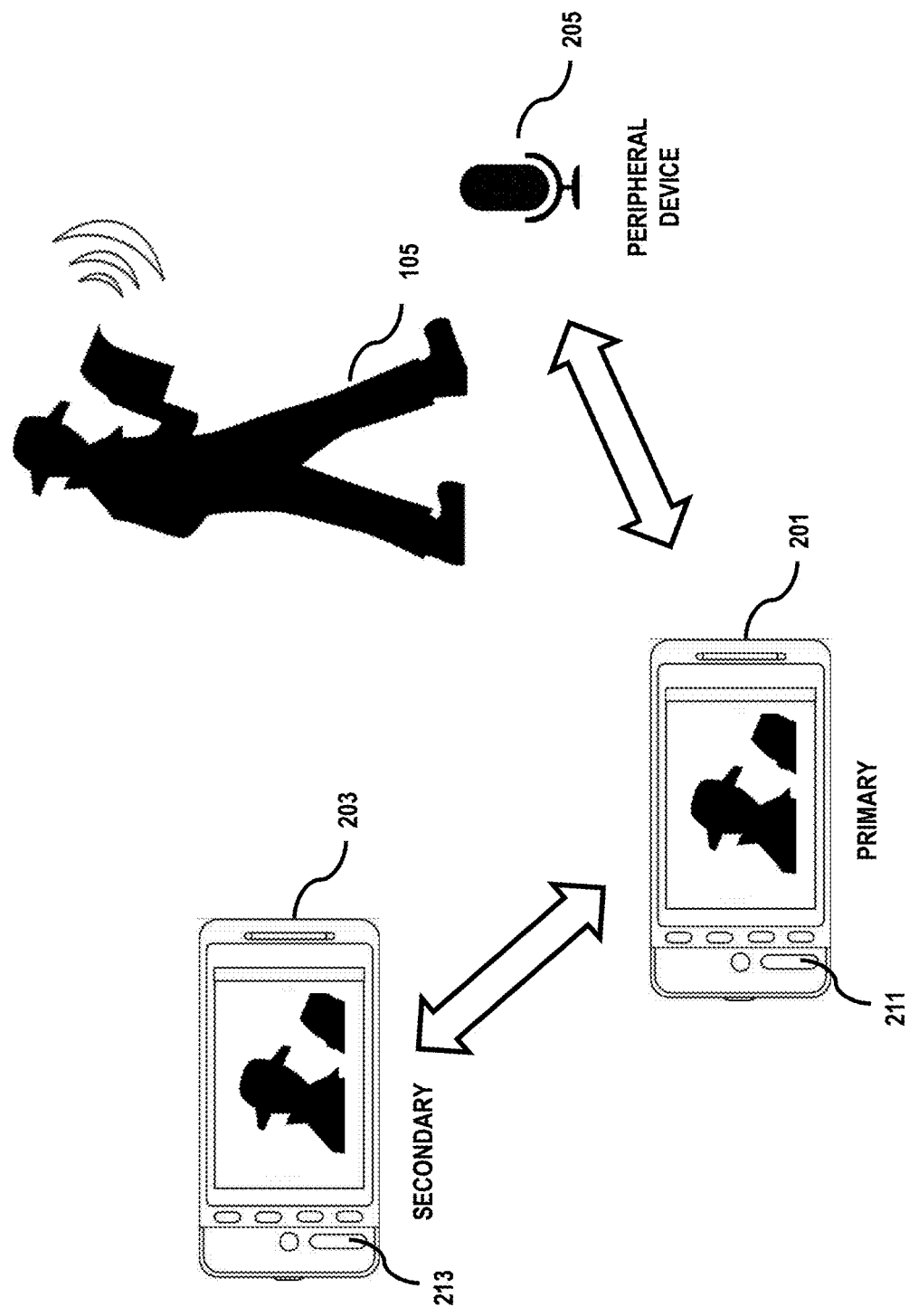
FIG. 2 is a diagram of possible configurations for use of multiple devices to provide dynamic camera shot making, according to various embodiments.

Examples of approaches for providing segment-based viewing of a watermarked recording are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIGS. 1A and 1B are, respectively, diagrams of a mobile device configured to provide zoom level or aperture control based on audio level within vicinity of the subject, according to various embodiments. The popularity of self-production of video content, such as video blogging (i.e., vlogging), stems in part because it is cost-effective and is an autonomous activity. Many of the creators work independently, and as such do not have camera operators to improve the quality of their recordings. In recognition of this problem, a process and associated system are introduced to enhance video production without incurring the cost of human resources, e.g., camera operator or cinema topographer. Notably, the process imitates the choices a camera operator or cinema topographer would make in response to emotional choices that a subject makes while filming.

As shown in FIG. 1A, a mobile device 100, such as a smartphone, portable computer, or a tablet device, includes one or more cameras 101 and a microphone 103 to capture an image and/or video recording of a subject 105. In this example, one of the cameras is aimed towards the same side as display 107, while the other one (not shown) is typically on the backside of the mobile device 100 and aimed at the subject 105. It is contemplated that the mobile device 100 can be turned around such that the camera 101 faces the subject; that is, the subject 105 can view the display 107. Under both scenarios, the microphone 103 can detect audio signals emanating in the direction of the subject 105, who can generate sounds 109 from speech or other means, such as any audible sounds from the vocal chords or objects (e.g., papers that can be rustled, whistles, etc.). Such sound variations can then be used as a control mechanism for the camera 101.

By way of example, the subject 105 is acting out a scene in which a document is been read as part of the video recording, the subject 105 can zoom in by speaking softly for dramatic effect; thus, subject 105 creates sound 109, which is an audio level that triggers a shot adjustment state whereby the camera 101 is instructed to zoom. Display 107 consequently shows a zoomed image of the subject 105 around the facial area. As such, the mobile device 100 effectively identifies facial cues and volume and pitch changes that represent emotional changes in the speaker 105. The shot change to a zoom shot is made to correspond to the emotion being displayed by the subject 105. Accordingly, the device 100 is configured to emulate filmmaking styles as to increase the emotional intensity or impact of the shot. The degree of zoom can be preset based on the film mode selected (this selection process is detailed in FIG. 4). It is noted that two different types of zooming may be supported by the mobile device 100: digital zoom and lens zooming. Because digital zoom can result in poorer resolution, the film mode may limit the digital zoom level accordingly. The return to the original shot can be based on when the audio level changes between a range or satisfies a threshold, or by another action by the subject. In FIG. 1B, the subject 105 can speak loudly to a point that triggers the mobile device 109 to detect an elevated audio level beyond a range (or threshold) to pan out. The wide shot is produced according to the selected film mode as to conform to a style of filmmaking.

It is noted that in addition to the zoom level, the mobile device 100 enables adjustment of the aperture (not shown). Aperture pertains to the amount of light that is passed through the camera len's diaphragm, affecting depth of field and shutter speed. The camera 101 can change aperture based on changes in volume. For instance, when the microphone 103 records quieter sounds, this triggers the camera 101 to change to a larger aperture (i.e., smaller f-number), thereby blurring the background and focusing on the foreground. When the microphone 103 picks up louder sounds, this triggers the camera 101 to cause the aperture to get smaller, which would expand the focus to include the foreground and the background. Medium volume can return the aperture to a standard size, for example. Moreover, the aperture setting is based on the film mode. It is contemplated that other camera parameters may be controlled, such as lighting, a flash (not shown) of the mobile device 100.

The shot adjustment of the mobile device 100 can also be controlled dynamically through facial expressions formed by the subject 109. This capability advantageously provides for autonomous adjustment of the camera 101 based on what the subject 105 is doing and saying, not just the static recognition of the subject's presence.

FIGS. 1C and 1D are, respectively, diagrams of a mobile device configured to provide zoom level or aperture control based on facial expressions of the subject, according to various embodiments. The mobile device 100, under this scenario, has facial recognition capabilities, whereby the facial expressions of the subject can be rendered and processed to determine whether the expression 111 triggers a shot adjustment state. The mobile device 100 may support a number of different predetermined expressions of the subject, such that the captured expression 111 is compared with these predetermined expressions. In this example, the subject makes an expression 111 indicating shock or alarm, which is identified as corresponding to one of the predetermined set of expressions that will trigger a zoom function. As such, the camera 101 is instructed to zoom to a certain zoom shot specified according to the film mode; it is noted that the view of the display 107 would be facing the subject (although for illustrative purposes, the mobile device 100 is shown in this manner). Again, the original shot mode may resume after a predetermined time period, expression 111 changes to another recognized expression, or by an action of the subject 101; further these aspects may be according to the film mode.

FIG. 1D depicts a situation whereby the mobile device 100 detects that the subject 105 have an expression 111 in which the subject is smiling. This expression 111 causes the camera 101 to pan out into a wide shot until, for example, the expression changes to one that corresponds to an original shot mode.

Table 1 below illustrates some exemplary control scenarios for zoom level and aperture (as default settings):

TABLE 1

| | FILM SHOT CONTROL SCENARIOS |
|---|---|
| a) | Zoom based on volume: |
| | i) Louder = zoom out |
| | ii) Quieter = zoom in |
| b) | Aperture based on volume: |
| | i) Louder = bigger f value |
| | ii) Quieter = smaller f value |
| c) | Zoom based on facial recognition: |
| | i) serious/sad expression = zoom in |
| | ii) excited/angry expression = zoom out |
| d) | Aperture based on facial recognition: |
| | i) serious/sad expression = smaller f value |
| | ii) Excited/angry expression = larger f value |
| e) | Zoom based on motion detection: |
| | i) Stillness = zoom in |
| | ii) Motion = zoom out |
| f) | Aperture based on motion detection: |
| | i) Stillness = smaller f value |
| | ii) Motion = larger f value |

In addition, the user can configure the various camera parameters manually. That is, the user can change any of the cause and effect relationships listed in Table 1 as well as turn on/off any of the features. The user can also select a range for any of the features to customize/personalize the settings. For instance, the various features can be set in the following ways, as in Table 2:

CAMERA SHOT SETTINGS

| 1) | Zoom Speed |
|---|---|
| | (1) Change how quickly it zooms in/out |
| 2) | Zoom Decibel Range |
| | (1) Can change how the camera responds to the inputs (i.e. zoom in when speaker is louder) |
| 3) | Aperture Speed |
| | (1) Change how quickly the aperture refocuses |
| 4) | Aperture (f) number range |
| | (1) Can select how far the aperture can change |
| 5) | Primary/Secondary Subjects |
| | (1) The user can select the subjects to focus on for filming/listening |

-continued

CAMERA SHOT SETTINGS

| 6) | Filters |
|---|---|
| | (1) The user can adjust camera filters to create different ambiance for the shots |
| 7) | Brightness |
| 8) | Day or Night Setting |
| | (1) The user can change the brightness level and the use of a light on the camera |
| 9) | Microphone Range |
| | (1) Can calibrate the software to the speaker's normal volume, |
| 10) | Microphone Preferences |
| | (1) If using multiple microphones the user can select which microphones will adjust camera features or can use all inputs from multiple microphones |

FIG. 2 is a diagram of possible configurations for use of multiple devices to provide dynamic camera shot making, according to various embodiments. Under this scenario, multiple mobile devices 201, 203 may communicate to improve the accuracy of detecting the audio levels by using two microphones 211, 213. For example, the mobile device 100, acting as the primary device, establishes communication with the mobile device 203, which is designated the secondary device. The communication connection is wireless via WiFi or Bluetooth, for instance. In this way, the audio signal captured by the microphone 213 of the secondary device 203 can be transmitted to the primary device 201 for processing with the audio signal captured by the primary device's microphone 211. If facial expression is to be used to control the type of shot, the secondary device 203 may capture the expression of the subject 105 and transmit the image to the primary device 201 to assist with facial recognition. The image, certain embodiments, is a single frame or a pre-determined number of frames for effective processing. Because the devices 201, 203 may be capturing the subject 105 from different angles, such diversity improves accuracy of the facial expression detection.

Alternatively or additionally, the mobile device 201 may instead connect wirelessly to a peripheral device 205 that has audio capture capability, such as a standalone microphone or a speaker with a microphone. Accordingly, the peripheral device 205 may be placed closer to the subject 105 to more accurately record any sounds or utterances from the subject 105. Through proper placement of the devices 201, 205, the subject 105 who is speaking (assuming there are multiple people in the shot) and then isolate the sound from the closest microphone, e.g., device 205. As such, the microphones can be configured to directionally record, such that variable sound recording levels can be controlled to increase or decrease to provide greater isolation. This can more accurately determine camera angle, zoom, aperture, and lighting proportionality by isolating the location of the speaker and picking up the sound as cleanly as possible.

Under the scenario in which multiple mobile devices 201, 203 are utilized, a combination of facial recognition, sound direction/distance, and body movements, the cameras 211, 213 capture various angles of a given subject 105 or area based on changes in the speaker's face and voice. In one embodiment, the additional camera can be in form of a drone, whereby the done in the air flying around the subject 105 can automatically adjust its relative position to obtain a high angle shot, face level shot, and lower angle shot. Proportionally, presets can help determine distance, angle, sound levels, and zoom. Additionally, a user can customize all of these same elements as well as adjust speed, pace of angles, etc.

Figure 3:
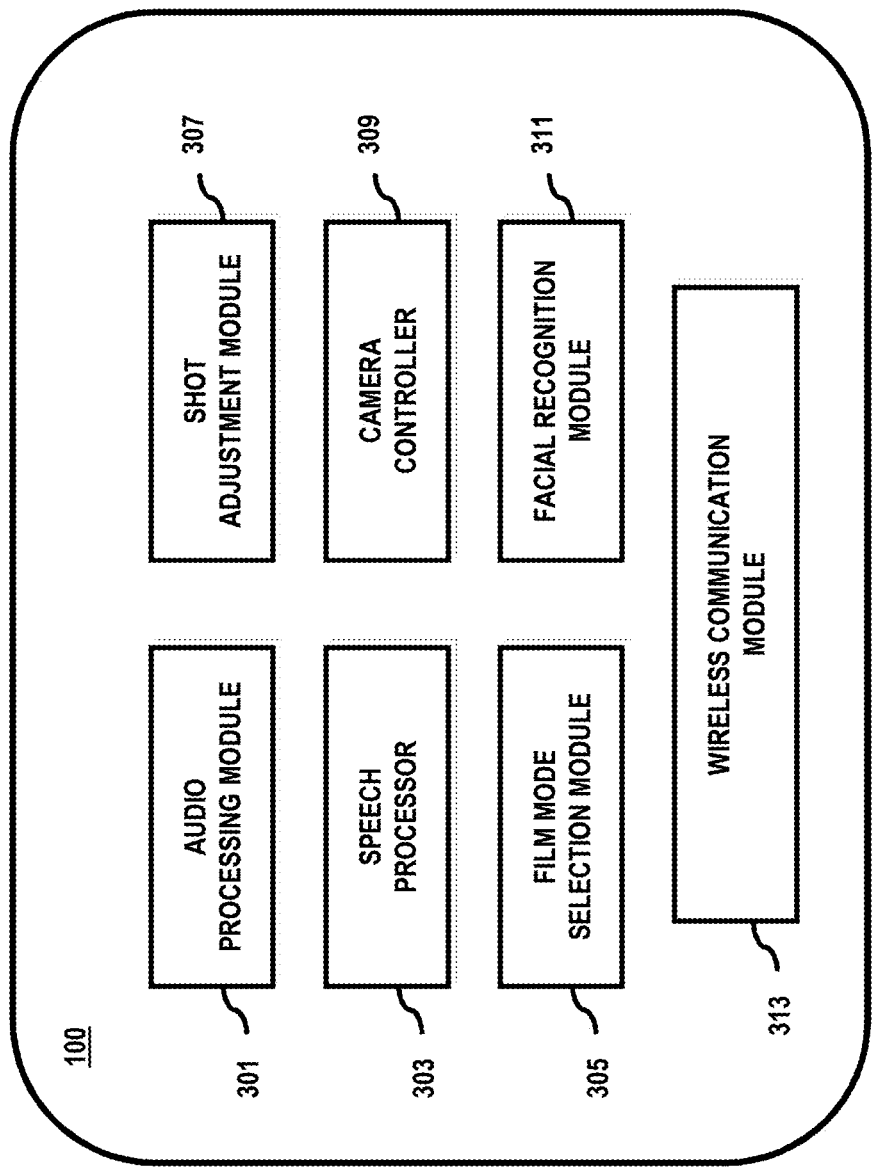
FIG. 3 is a diagram of the functional components of the mobile device of FIGS. 1A-1D, according to one embodiment.

FIG. 3 is a diagram of the functional components of the mobile device of FIGS. 1A-1D, according to one embodiment. To accomplish the various functions described herein, the mobile device 100 (of FIGS. 1A-1D) includes an audio processing module 301, a speech processor 303, a film mode selection module 305, a shot adjustment module 307, a camera controller 309, a facial recognition module 311, and a wireless communication module 313. Although indicated as modules, these components 301-313 may be implemented in a combination of hardware and software to enable dynamic adjustment of camera shots. Specifically, the audio processing module 301 receives one or more audio signals from the microphone 103 to determine the audio level. To accomplish this, the audio processing module 301 may apply various audio filters to ensure the captured audio signals emanate from the proximity of the subject. The module 301 may also calibrate the audio level based on the ambience noise level; for example, if the shot is been taken within an urban setting, perhaps the sounds of traffic can be mitigated. The audio signals are input to the speech processor 303 to detect whether intelligible speech can be discern from the subject 105. As will be explained later, the speech processor 303 can additionally determine the pacing or cadence of the speech.

As shown, the film mode selection module 305 allows a user to select the particular filming styles, which effectively provides default configuration settings for the camera parameters to implement the selected film mode. The film mode selection module 305 can support various film modes, e.g.: sports/action, slow motion, extreme close-up, indie film, documentary, extreme pan, film noir, monologue, video blog (vlog) monologue, or customized. These modes can be presented for selection by the user using a graphical user interface (GUI), as that shown in FIG. 5. Once the user inputs a selection, the shot adjustment module 307 instructs the camera controller 309 accordingly to produce shots according to camera control settings corresponding to the selected film mode.

The mobile device 100 additional has a facial recognition module 311 to capture the facial expression of the subject 105 for processing to determine the type of expression the subject 105 is emoting. Further, the facial recognition module 311 employs state of the art facial and eye retina technology. Once the expression is determined by the module 311 in conjunction with the shot adjustment module 307, the shot adjustment module 307 generates control instructions to the camera controller 309 specifying the camera parameters, e.g., zoom control, aperture, lighting, or a combination thereof.

To support a multi-device arrangement of FIG. 2, the mobile device 100 includes wireless communication module 313 to communicate with another mobile device or a peripheral device. Such communication, for instance, can be via wireless networking technology (e.g., WiFi, etc.) or short-range wireless communication technology (e.g., near-field communications (NFC), Bluetooth, ZigBee, infrared transmission, etc.).

Figure 4:
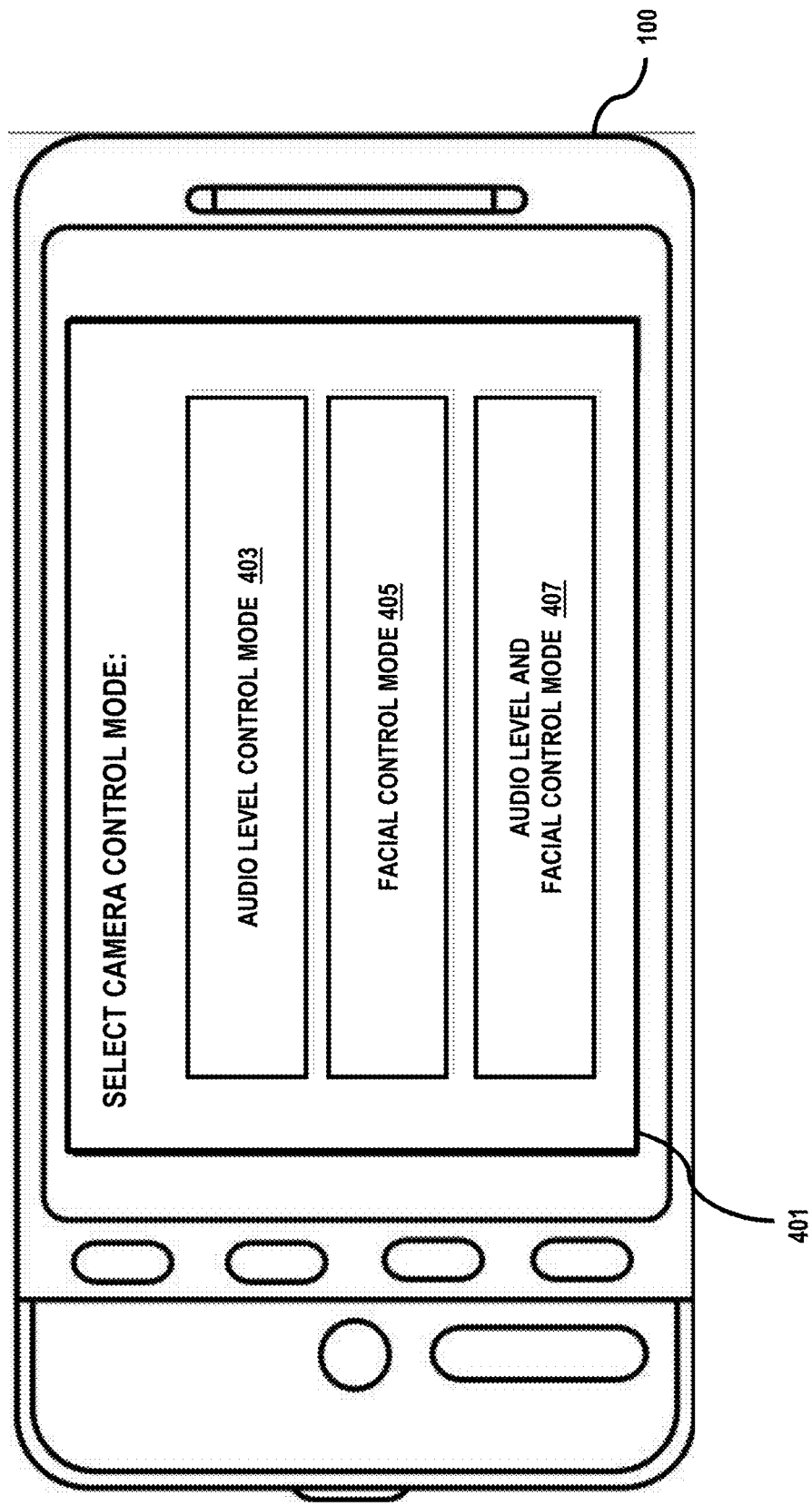
FIG. 4 is a diagram of a graphical user interface (GUI) for camera control mode selection via the mobile device of FIGS. 1A-1D, according to one embodiment.

FIG. 4 is a diagram of a graphical user interface (GUI) for camera control mode selection via the mobile device of FIGS. 1A-1D, according to one embodiment. As evident from the exemplary scenarios of FIGS. 1A-1D, dynamic adjustment of camera shots can be triggered based on audio levels and/or facial expressions. Thus, the mobile device 100 provides for designation of these various control modes. As shown, GUI 401 includes the following three sections to enable input by the user: an audio level control mode 403, a facial control mode 405, and an audio level and facial control mode 407. With the audio level control mode 403, the device 100 is strictly controlling camera shots based on the audio level associated with the subject 105 (as in FIGS. 1A and 1B). Alternatively, the facial control mode 405 permits control of the filming by the detected expressions of the subject 105; such mode may be preferred in a setting in which the noise level must be kept to a minimum, such as a library or a church. Additionally, the mobile device 100 supports the capability to adjust film shots using both audio levels and facial expressions.

This capability to dynamically adjust film shots could be utilized in a number of media fields. These fields may include television, music videos, films, as well as individual filming. By way of example, the dynamic shot making capability has tremendous application in wildlife management; e.g., placing cameras placed in the field would zoom in on sources of sound they could be more effective at finding animals. Many other applications are contemplated depending on the subject matter, e.g., a musician self-filming a music video.

Figure 5:
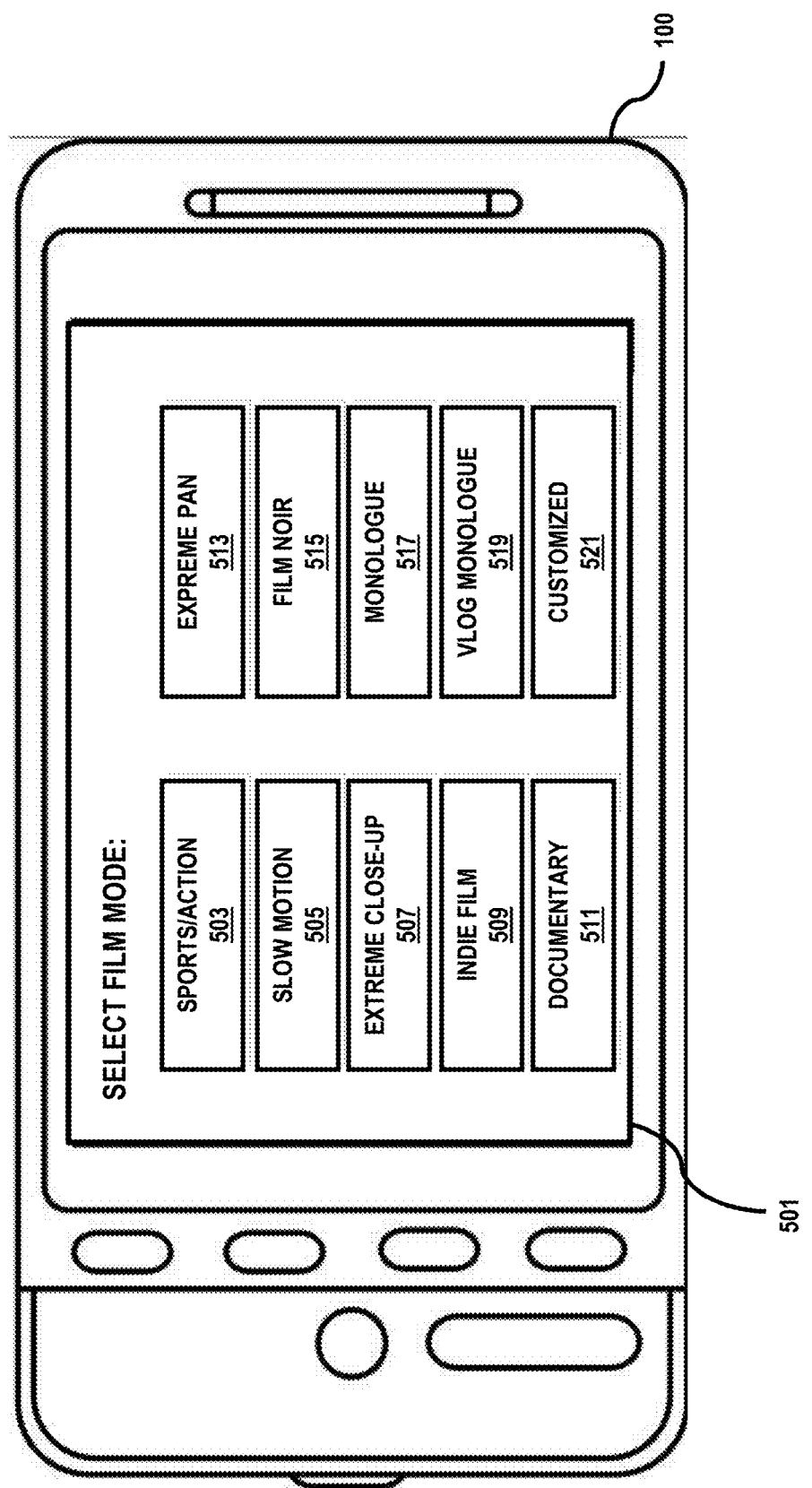
FIG. 5 is a diagram of a graphical user interface (GUI) for film mode selection via the mobile device of FIGS. 1A-1D, according to one embodiment.

FIG. 5 is a diagram of a graphical user interface (GUI) for film mode selection via the mobile device of FIGS. 1A-1D, according to one embodiment. In this example, the mobile device 100 provides a GUI 501 to allow a user to select a particular film mode, such that the camera parameters are pre-set or pre-configured according to the selected film mode. That is, film modes or styles dictate when and how and at what degree of zooming levels are used; the aperture settings and/or flash control may be set accordingly as well. By way of example, the following film modes are provided: a sports/action mode 503, a slow motion mode 505, an extreme close-up mode 507, an indie film mode 509, a documentary mode 511, an extreme pan mode 513, a film noir mode 515, a monologue mode 517, a video blog (vlog) monologue mode 519, or a customized mode 521.

Details of certain film modes are described as follows for the purposes of illustration. With the sports/action mode 503, zoom range is large and changes quickly, f value is large and does not change; the zooming and aperture are triggered by changes in motion and volume, not emotional facial recognition. Also, the sports/action mode 503 can have filters to provide high contrast, vibrancy, and saturation. In the extreme close-up mode 507, for example, zoom range is minimal, and f value is small and does not change; these parameters are triggered by changes in voice and emotional facial recognition, and not motion. For indie film mode 509, the zoom range is minimal, and f value varies based on input; the changes in shots are primarily by emotional facial recognition, and the filter is marked by Low saturation and clarity. With film noir mode 515, the zoom range is moderate, and f value varies based on input; adjustment is triggered by voice, face, and movement. In the case of the monologue mode 517, the zoom range is moderate, and f value is small and does not change; adjustment is triggered by voice, face, and movement. The other film mode have different characteristics.

With customized mode 521, the user can pre-select the following elements prior to filming: (1) subjects/objects within scene; (2) primary/secondary subjects/angles (when employing multiple cameras); (3) angle preferences; (4) camera priorities (e.g., in FIG. 2, camera 211 follows subject 105). Based on these preferences, users can select how they want to film a scene and the stylistic elements to be included; e.g., talking scene between subject (A) and subject (B) can have a level angle and low angle. Upon subject (A) speaking, a secondary camera can perform a dolly zoom at a level angle while also focused on subject (B). Simultaneously, primary camera (high angle) can shoot a wide angle shot on subject (A).

It is contemplated that other film modes can be supported; e.g., a mode can be developed to be in the style of a renowned director or cinematographer.

Figures 6, 7:
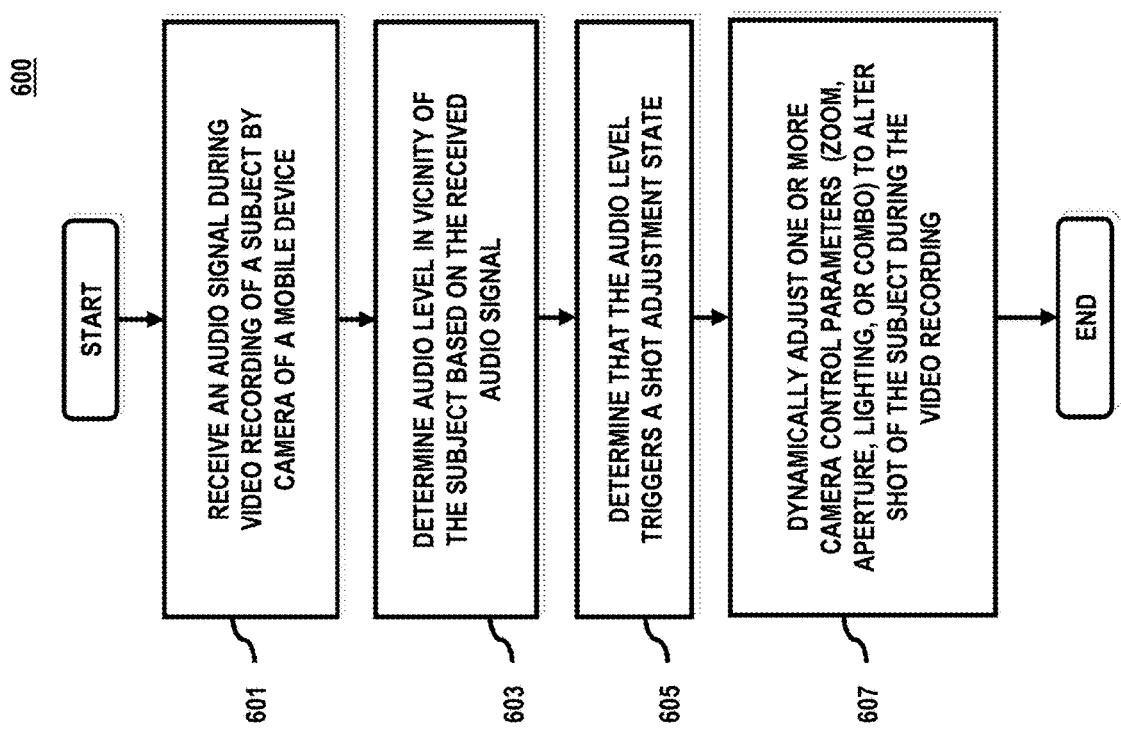
FIG. 6 is a flowchart of a process for dynamic adjustment of camera parameters based on audio levels, according to an exemplary embodiment.
FIG. 7 is a flowchart of a process for dynamic adjustment of camera parameters based on facial expression, according to an exemplary embodiment.

FIG. 6 is a flowchart of a process for dynamic adjustment of camera parameters based on audio levels, according to an exemplary embodiment. Continuing with the example of FIGS. 1A-1D and FIG. 2, the mobile device 100 can execute process 600, which provides camera shot adjustments dynamically. In step 601, an audio signal is received via a microphone 103 of the mobile device 100 during video recording of the subject 105 by the camera 101 of the mobile device 100. The audio signal represents the sounds around the subject 105 or emanating from the subject 105 either as speech or other utterances or sounds. The audio signal is processed by the audio processing module 301 and the speech processor 303 to determine, as in step 603, the audio level in a vicinity of the subject 105 based on the received audio signal. Again, as explained, the audio level is based on sounds produced by the subject 105 and other surrounding sounds, which can be filtered out by the audio processing module 301. In step 605, the shot adjustment module 307 determines that the audio level triggers a shot adjustment state. This trigger can be based on a predetermined threshold level (e.g., expressed in decibels) or range of levels, as set by the film mode. In step 607, the shot adjustment module 307 instructs the camera controller 309 to dynamically adjust, in response to the shot adjustment state, one or more camera parameters of the camera 101 to alter shot of the subject 105 by the camera 101 during the video recording. The dynamic adjustment stems from the fact that the camera control is occurring during the video recording versus modification of the video recording during editing or post-production. In one embodiment, the camera parameters relate to either zoom control, aperture, lighting, or a combination thereof.

FIG. 7 is a flowchart of a process for dynamic adjustment of camera parameters based on facial expression, according to an exemplary embodiment. Alternatively, the mobile device 100 can execute process 700, and detect facial expression of the subject 105 using the facial recognition module 311 (step 701); and determine, via that shot adjustment module 307, that the facial expression triggers the shot adjustment state, per step 703. As noted earlier, adjustment via facial expression can be an additional (as well as alternative) feature overlaid onto the audio level. Under this scenario, the dynamic adjustment using facial expressions is an additional feature; and thus, the dynamic adjustment is further based on the detected facial expression, per step 705.

FIG. 8 is a flowchart of a process for generating camera instructions based on pacing of speech, according to an exemplary embodiment. Under this scenario, the mobile device 100 executes process 800 by utilizing the speech processor 303 (of FIG. 3) to detect speech of the subject 105, as in step 801. Next, the speech processor 303 determines pace or cadence of the speech from the subject 105, per step 803. The shot adjustment module 307 then, per step 805, generates a camera instruction message to change zoom level or aperture setting of the camera 101 based on the determined pace of the speech. It is contemplated that the process 800 can be executed as a complement to the processes 600 and 700.

Two scenarios are described for the purposes of illustration. The subject 105 speaks fast and then changes the rate of speech to a much slower pace. This change can result in the camera zooming in closer as well as the aperture getting larger (i.e., smaller f-number). If the subject 105 increases the pace or rate of words then the camera zooms out and the aperture is set to a smaller value (i.e., larger f-number).

In the next scenario, the subject 105 has playing music in the shot, and the pace of the music speeds up. This can cause the camera 101 to zoom out as well as the aperture setting being reduced (i.e., larger f-number). Alternatively, if the pace or speed of the music slows down then the camera 101 would zoom in and the aperture would get larger (smaller f-number).

FIG. 9 is a flowchart of a process for determining audio level from multiple audio signal sources, according to an exemplary embodiment. Process 900 is described according to the example of FIG. 2. The mobile device 201 is designated as a primary device, and detects the presence of a second device, which is either the mobile device 203 or the peripheral device 205, as in step 901. By way of example, the secondary device is the mobile device 203. In step 903, the primary device 201 establishes communication with the mobile device 203, which is designated the secondary device. The communication connection is wireless via WiFi or Bluetooth, for instance. During the video recording of the subject 105 by the primary device 201, the secondary device 203 is also concurrently recording the subject 105. The audio signal captured by the microphone 213 of the secondary device 203 during such recording can be transmitted to the primary device 201 for processing. In step 905, the primary device 201 receives the secondary audio signal from the second device 203, and determines the audio level using the primary audio signal and the secondary audio signal.

Although the process 900 is described with respect to the audio level based control, it is noted that use of the mobile device 203 can greatly improve the facial expression based control. That is, because the devices 201, 203 can be strategically placed to capture the face of the subject 105 from different angles, greater accuracy of the facial expression detection can be achieved. It is also contemplated that the two devices 201, 203 can concurrently use its respective facial recognition modules to detect the expression, whereby the first device to detect the expression will prevail. In other words, if the secondary device 203 completes the detection first, the device 203 can forward such information to the primary device 201. This capability is advantageous if the secondary device 203 has greater processing power than the primary device 201.

The processes described herein for dynamic shot adjustment may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
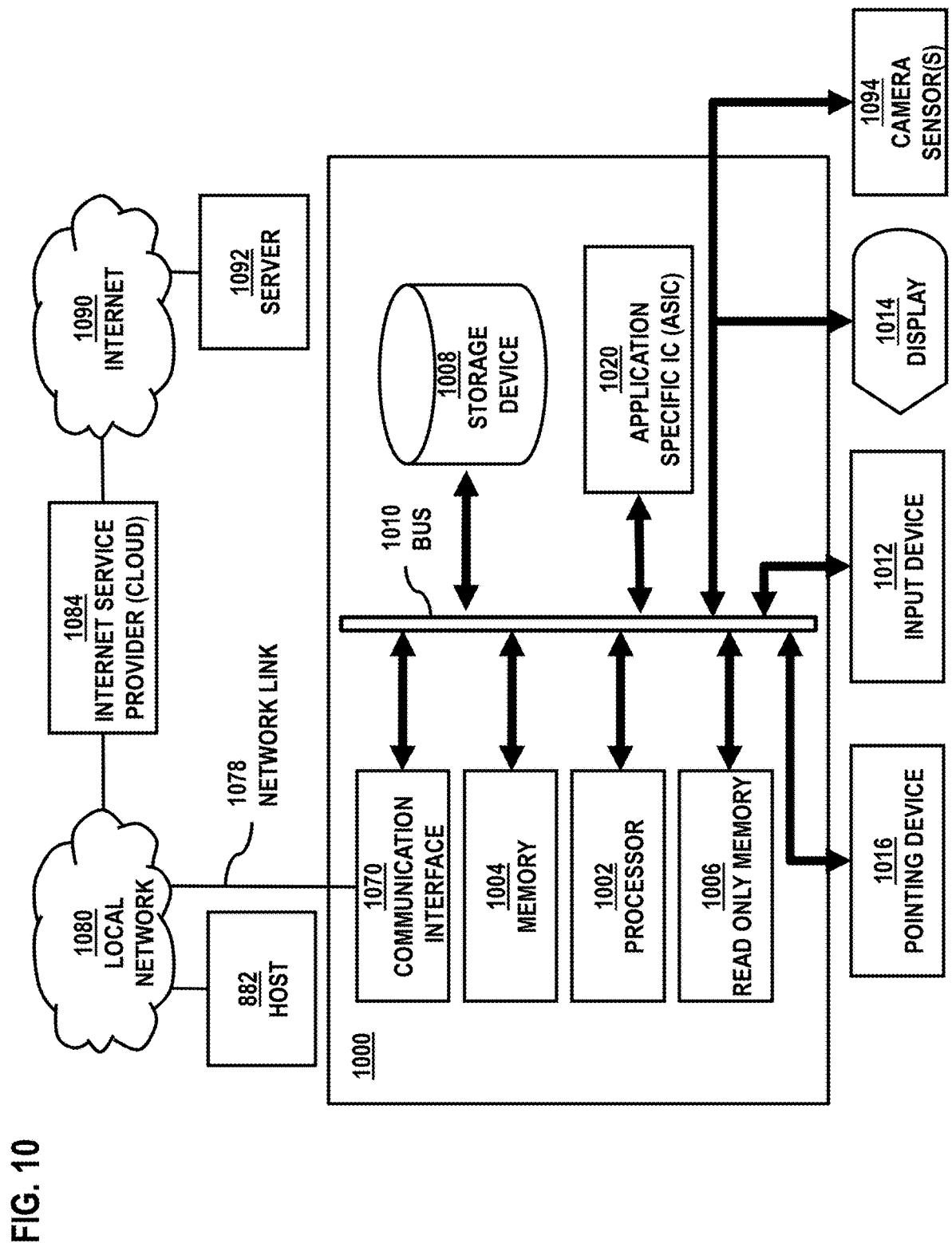
FIG. 10 is a diagram of system capable of providing dynamic adjustment of camera shots via a video platform, according to an exemplary embodiment.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to dynamically adjust camera parameters to alter film shots as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of a segment-based viewing of a watermarked recording.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to a segment-based viewing of a watermarked recording. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for a segment-based viewing of a watermarked recording. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for a segment-based viewing of a watermarked recording, is provided to the bus 1010 for use by the processor from an external input device 1002, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1004, such as a cathode ray tube (CRT), a liquid crystal display (LCD), a light emitting diode (LED) display, an organic LED (OLED) display, a plasma screen, or a printer for presenting text or images, and a pointing device 1006, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1002, display device 1004 and pointing device 1006 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet.

Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the telephony network 107 for a segment-based viewing of a watermarked recording to the user equipment 103.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
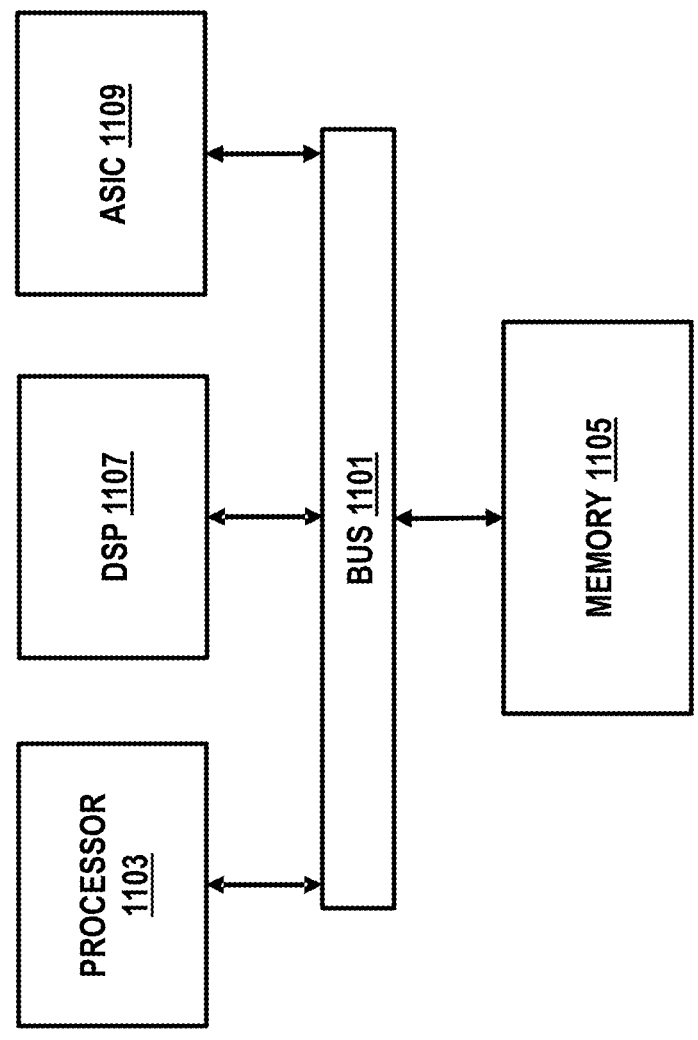
FIG. 11 is a diagram of a chip set that can be used to implement an embodiment of the invention.

FIG. 11 illustrates a chip set or chip 1100 upon which an embodiment of the invention may be implemented. Chip set 1100 is programmed to dynamically adjust camera parameters to alter film shots as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of segment-based viewing of a watermarked recording.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to a segment-based viewing of a watermarked recording. The memory 1105 also stores the data associated with or generated by the execution of the inventive steps.

Figure 12:
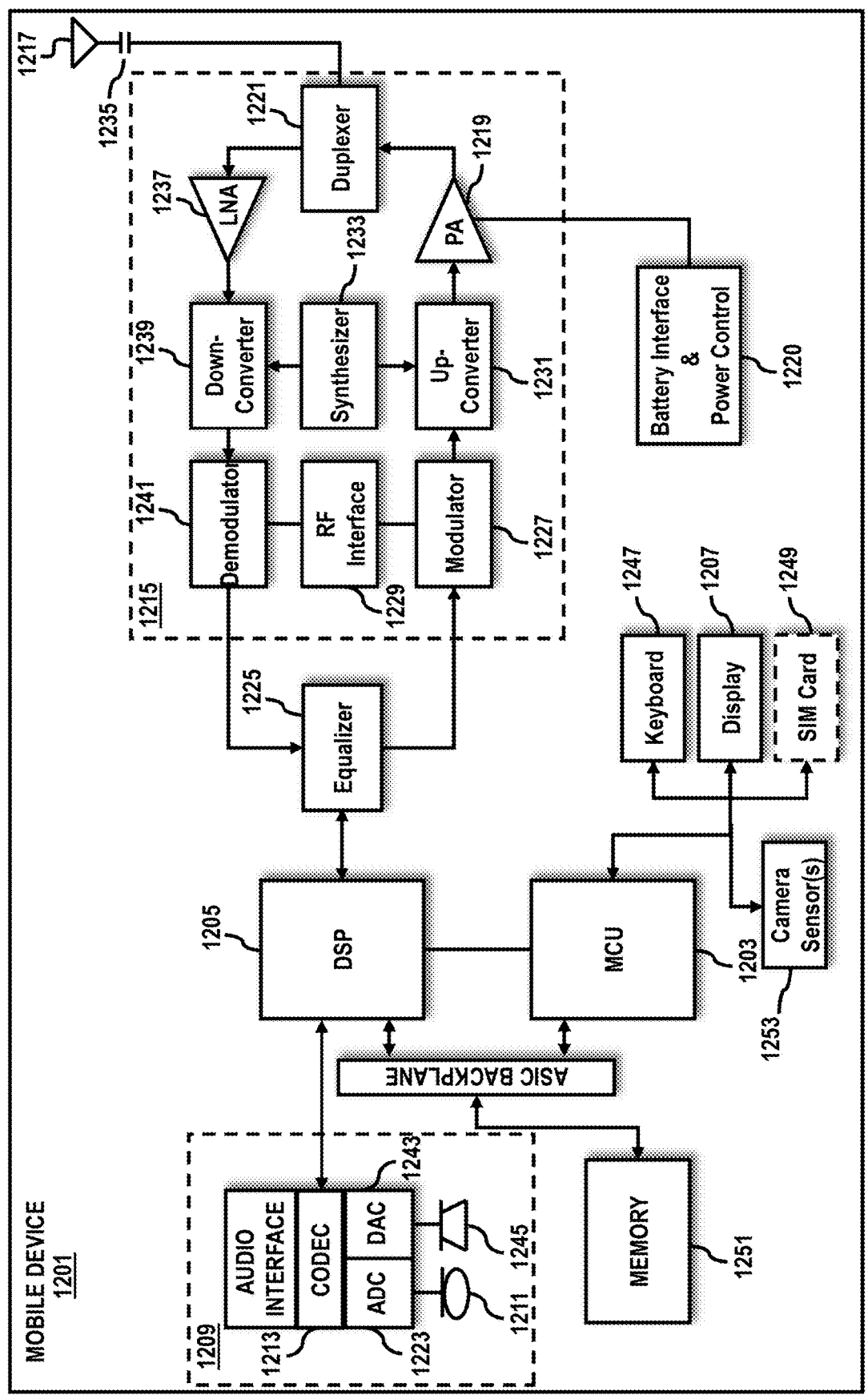
FIG. 12 is a diagram of a mobile device (e.g., handset) that can be used to implement an embodiment of the invention.

FIG. 12 is a diagram of exemplary components of a mobile device (e.g., handset) for communications, which is capable of operating in the system of FIG. 1, according to one embodiment. In some embodiments, mobile device 1201, or a portion thereof, constitutes a means for dynamic adjustment of camera parameters. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile device functions that perform or support the steps of segment-based viewing of a watermarked recording. The display 1207 includes display circuitry configured to display at least a portion of a user interface of the mobile device (e.g., mobile telephone). Additionally, the display 1207 and display circuitry are configured to facilitate user control of at least some functions of the mobile device. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile device 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile device 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile device 1201 to a segment-based viewing of a watermarked recording. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile device 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile device 1201 on a radio network.

The card 1249 also contains a memory for storing a personal telephone number registry, text messages, and user specific mobile device settings.

Further, one or more camera sensors 1253 may be incorporated onto the mobile device 1201 wherein the one or more camera sensors may be placed at one or more locations on the mobile device. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

Accordingly, an approach is disclosed for providing segment-based viewing of a watermarked recording.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving an audio signal via a microphone of a mobile device during video recording of a subject by a camera of the mobile device;
    determining, at the mobile device, an audio level in a vicinity of the subject based on the received audio signal, wherein the audio level is based on sounds produced by the subject;
    determining that the audio level triggers a shot adjustment state;
    dynamically adjusting, in response to the shot adjustment state, one or more camera parameters of the camera to alter shot of the subject by the camera during the video recording,
    wherein the one or more camera parameters relate to either zoom control, aperture, lighting, or a combination thereof;
    establishing a wireless connection with other mobile device having a microphone configured to generate a second audio signal during the video recording by the mobile device; and
    receiving, by the mobile device, the second audio signal from the other mobile device, wherein the determination of the audio level is further based on the second audio signal.

2. The method of claim 1, wherein the other mobile device includes a camera, the method further comprising:
    generating a camera instruction message to control the camera of the other mobile device according to the determined shot adjustment state.

3. The method of claim 1, further comprising:
    detecting facial expression of the subject;
    determining that the facial expression triggers the shot adjustment state; and
    dynamically adjusting, in response to the shot adjustment state, one or more camera parameters.

4. The method of claim 1, further comprising:
selecting one of a plurality of film modes that specify pre-set settings for the one or more camera parameters; and
dynamically adjusting the one or more camera parameters based, at least in part, on the selected film mode.

5. The method of claim 1, further comprising:
detecting a change in the audio level outside a predetermined range; and
generating a camera instruction message to change the one or more camera parameters based, at least in part, on the change in the audio level.

6. The method of claim 1, further comprising:
detecting speech of the subject;
determining a pace of the speech; and
generating a camera instruction message to change the one or more camera parameters based, at least in part, on the determined pace of the speech.

7. An apparatus comprising:
at least one processor; and
at least one memory including computer program code for one or more programs,
the at least one memory and the computer program code configured to, with the at least one processor, cause the apparatus to perform at least the following,
receive an audio signal via a microphone of a mobile device during video recording of a subject by a camera of the mobile device;
determine, at the mobile device, an audio level in a vicinity of the subject based on the received audio signal, wherein the audio level is based on sounds produced by the subject;
determine that the audio level triggers a shot adjustment state;
dynamically adjust, in response to the shot adjustment state, one or more camera parameters of the camera to alter shot of the subject by the camera during the video recording,
wherein the one or more camera parameters relate to either zoom control, aperture, lighting, or a combination thereof; and
establish a wireless connection with other mobile device having a microphone configured to generate a second audio signal during the video recording by the mobile device; and
receive, by the mobile device, the second audio signal from the other mobile device, wherein the determination of the audio level is further based on the second audio signal.

8. The apparatus of claim 7, wherein the other mobile device includes a camera, the apparatus being further caused to:
generate a camera instruction message to control the camera of the other mobile device according to the determined shot adjustment state.

9. The apparatus of claim 7, wherein the apparatus is further caused to:
detect facial expression of the subject;
determine that the facial expression triggers the shot adjustment state; and
dynamically adjust, in response to the shot adjustment state, one or more camera parameters.

10. The apparatus of claim 7, wherein the apparatus is further caused to:
select one of a plurality of film modes that specify pre-set settings for the one or more camera parameters; and
dynamically adjust the one or more camera parameters based, at least in part, on the selected film mode.

11. The apparatus of claim 7, wherein the apparatus is further caused to:
detect a change in the audio level outside a predetermined range; and
generate a camera instruction message to change the one or more camera parameters based, at least in part, on the change in the audio level.

12. The apparatus of claim 7, wherein the apparatus is further caused to:
detect speech of the subject;
determine the pace of the speech; and
generate a camera instruction message to change the one or more camera parameters based, at least in part, on the determined pace of the speech.

13. A system comprising:
a mobile device configured to receive an audio signal via a microphone of a mobile device during video recording of a subject by a camera of the mobile device;
an audio processor configured to determine an audio level in a vicinity of the subject based on the received audio signal, wherein the audio level is based on sounds produced by the subject;
a facial recognition component configured to detect facial expression of the subject;
a shot adjustment component configured to determine that the audio level or the facial expression triggers a shot adjustment state, and to instruct a camera controller within the mobile device to dynamically adjust, in response to the shot adjustment state, one or more camera parameters of the camera to alter shot of the subject by the camera during the video recording,
wherein the one or more camera parameters relate to either zoom control, aperture, lighting, or a combination thereof; and
a wireless communication circuitry configured to establish a wireless connection with other mobile device having a microphone configured to generate a second audio signal during the video recording by the mobile device,
wherein the wireless communication circuitry being further configured to receive the second audio signal from the other mobile device,
wherein the determination of the audio level is further based on the second audio signal,
wherein the other mobile device includes a camera, and the shot adjustment component is further configured to generate a camera instruction message to control the camera of the other mobile device according to the determined shot adjustment state.

14. The system of claim 13, further comprising:
a wireless communication circuitry configured to establish a wireless connection with a peripheral device configured to generate a second audio signal during the video recording by the mobile device,
wherein the wireless communication circuitry being further configured to receive the second audio signal from the peripheral device,
wherein the determination of the audio level is further based on the second audio signal, and
wherein the other mobile device includes a camera, and the shot adjustment component is further configured to generate a camera instruction message to control the camera of the other mobile device according to the determined shot adjustment state.

15. The system of claim 13, further comprising:
a film mode selection component configured to select one of a plurality of film modes that specify pre-set settings for the one or more camera parameters, wherein the dynamic adjustment of the one or more camera parameters is based, at least in part, on the selected film mode.

16. The system of claim 13, wherein the shot adjustment component is further configured to detect a change in the audio level outside a predetermined range, and to generate a camera instruction message to change the one or more camera parameters based, at least in part, on the change in the audio level.

17. The system of claim 13, further comprising:
a speech processor configured to detect speech of the subject, and to determine the pace of the speech, wherein the shot adjustment component is configured to generate a camera instruction message to change the one or more camera parameters based, at least in part, on the determined pace of the speech.

* * * * *